United States Patent
Tanase

(10) Patent No.: US 11,209,881 B2
(45) Date of Patent: Dec. 28, 2021

(54) INFORMATION PROCESSING APPARATUS, CONTROL METHOD OF INFORMATION PROCESSING APPARATUS, AND PROGRAM TO TRANSMIT A POWER REQUEST TO AN EXTERNAL DEVICE

(71) Applicant: BROTHER KOGYO KABUSHIKI KAISHA, Nagoya (JP)

(72) Inventor: Naomasa Tanase, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/775,352

(22) Filed: Jan. 29, 2020

(65) Prior Publication Data

US 2020/0241615 A1 Jul. 30, 2020

(30) Foreign Application Priority Data

Jan. 30, 2019 (JP) .............................. JP2019-014190

(51) Int. Cl.
  *G06F 1/26* (2006.01)
  *G06K 15/00* (2006.01)
  *H02J 7/00* (2006.01)

(52) U.S. Cl.
  CPC ............... *G06F 1/26* (2013.01); *G06K 15/40* (2013.01); *H02J 7/0048* (2020.01)

(58) Field of Classification Search
  None
  See application file for complete search history.

(56) References Cited

U.S. PATENT DOCUMENTS

| | | | |
|---|---|---|---|
| 7,560,898 B1 * | 7/2009 | Kranzen | H02J 2207/40 320/107 |
| 2009/0284225 A1 * | 11/2009 | Nakanuma | H01M 10/441 320/134 |
| 2015/0362984 A1 * | 12/2015 | Waters | G06F 1/3215 713/324 |
| 2017/0220087 A1 * | 8/2017 | Hijazi | G06F 1/30 |
| 2017/0222444 A1 * | 8/2017 | Hijazi | H02J 7/0068 |
| 2017/0293335 A1 * | 10/2017 | Dunstan | H02J 7/00 |
| 2018/0219986 A1 * | 8/2018 | Lee | H04M 1/0262 |
| 2019/0324510 A1 * | 10/2019 | Hijazi | G06F 1/266 |
| 2020/0083740 A1 * | 3/2020 | Sultenfuss | G06F 1/263 |

FOREIGN PATENT DOCUMENTS

JP 2015-174375 A 10/2015
JP 2015-176443 A 10/2015

* cited by examiner

*Primary Examiner* — Danny Chan
(74) *Attorney, Agent, or Firm* — Scully, Scott, Murphy & Presser, PC

(57) ABSTRACT

An information processing apparatus includes a first interface, a second interface, and a controller configured to receive first power source information related to a power source of a first external device connected to the first interface, receive second power source information related to a power source of a second external device connected to the second interface, select one of the first external device and the second external device to which a power request is to be transmitted based on the first power source information and the second power source information, and transmit a power request to the selected external device based on a result of the selection processing of one of the first external device and the second external device.

18 Claims, 8 Drawing Sheets

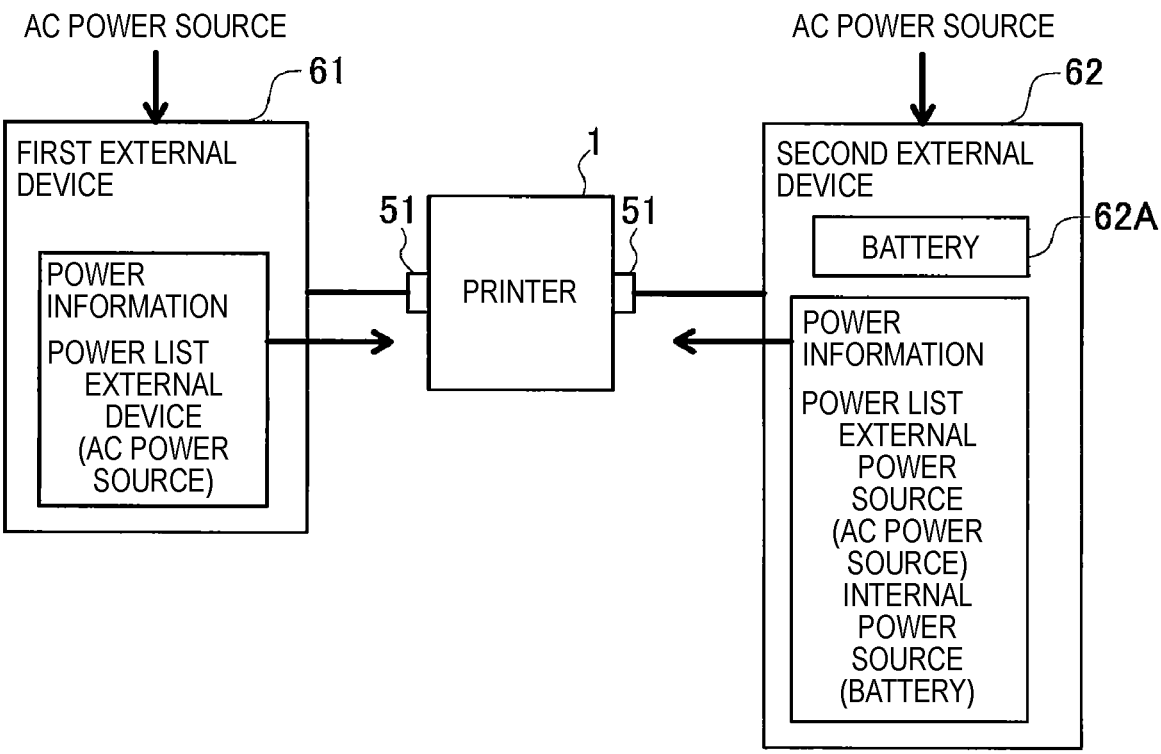

INFORMATION PROCESSING APPARATUS, CONTROL METHOD OF INFORMATION PROCESSING APPARATUS, AND PROGRAM TO TRANSMIT A POWER REQUEST TO AN EXTERNAL DEVICE

CROSS REFERENCE TO RELATED APPLICATIONS

This application is based on Japanese Patent Applications No. 2019-014190 filed on Jan. 30, 2019, the entire contents of which are incorporated herein by reference.

TECHNICAL HELD

The present disclosure relates to an information processing apparatus that receives power from an external device, a control method for the information processing apparatus, and a program.

BACKGROUND

In the related art, for example, there is a power receiving apparatus that receives power from a power feeding apparatus by a method according to the USB power delivery (PD) standard (for example, JP-A-2015-176443) The power receiving apparatus disclosed in JP-A-2015-176443 functions as a power sink and receives power from a printer connected to an AC power source.

When a plurality of external devices that may supply power, such as a printer, are connected, the power receiving apparatus described above needs to select an external device to receive power from among the plurality of external devices and request power. Since the power supply configuration and the like of the external devices are different, it is preferable to select a more appropriate external device from the plurality of external devices.

The present application has been proposed in view of the above-described problems, and an object thereof is to provide an information processing apparatus, a control method of the information processing apparatus, and a program that is configured to select an appropriate external device for receiving power and transmit a power request.

SUMMARY

According to an aspect of the invention, an information processing apparatus includes a first interface, a second interface, and a controller configured to receive first power source information related to a power source of a first external device connected to the first interface, receive second power source information related to a power source of a second external device connected to the second interface, select one of the first external device and the second external device to which a power request is to be transmitted based on the first power source information and the second power source information, and transmit a power request to the selected external device based on a result of the selection processing of one of the first external device and the second external device.

In addition, the content of disclosure of the description is implementable not only as an information processing apparatus, but also as a control method for controlling the information processing apparatus, and a program executing by a computer controlling the information processing apparatus.

The information processing apparatus or the like according to the present application selects an external device to request power among the first and second external devices based on received first and second power source information. Accordingly, it is possible to select a more appropriate external device for receiving power and transmit a power request.

BRIEF DESCRIPTION OF DRAWINGS

FIG. 7 is a diagram illustrating an example of the connection form;

FIG. 8 is a diagram illustrating the contents of history information;

DESCRIPTION OF EMBODIMENTS

Hereinafter, a portable printer 1 as an embodiment of an information processing apparatus of the present application will be described with reference to FIG. 1.

1. Configuration of Portable Printer

Figure 1:
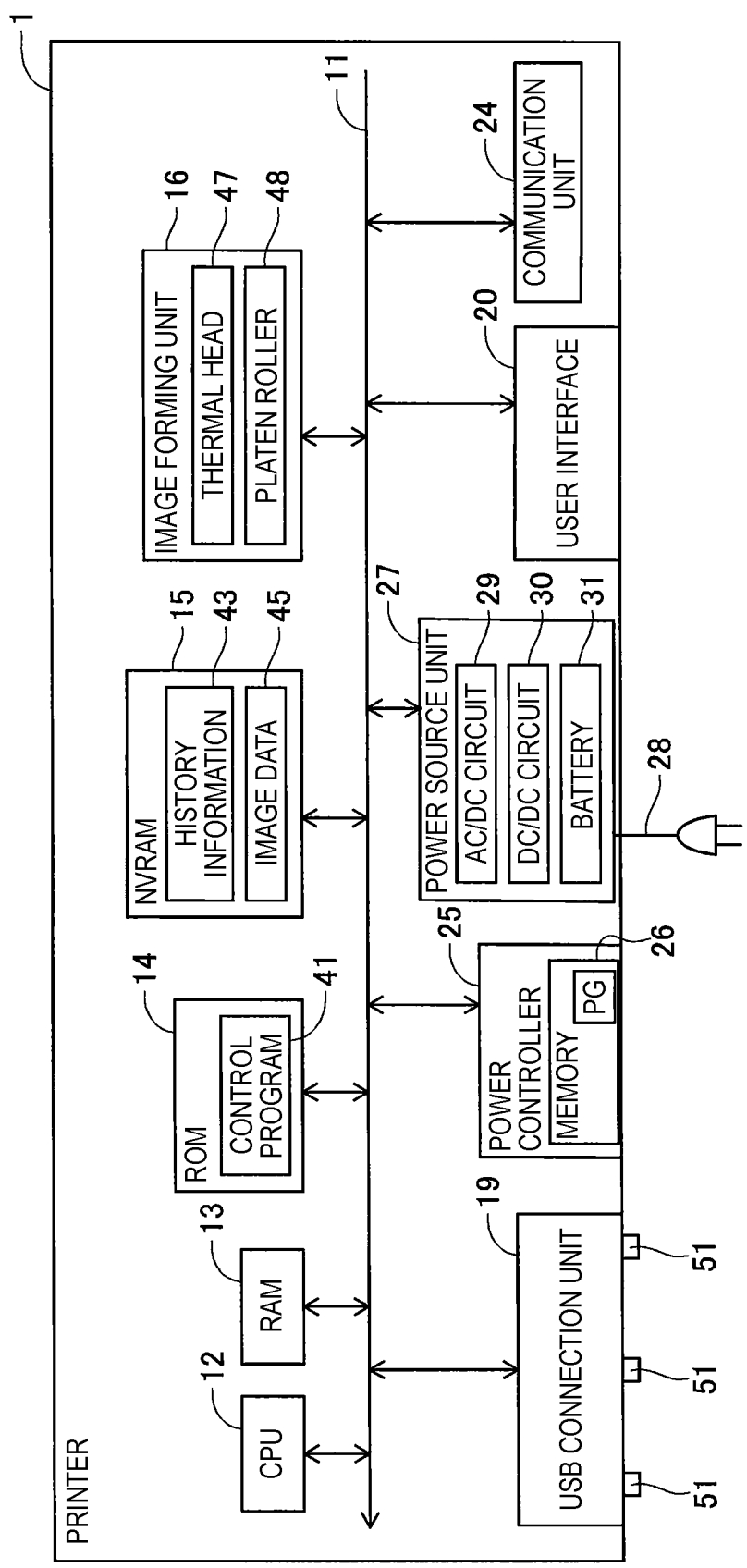
FIG. 1 is a block diagram illustrating an electrical configuration of a printer according to an embodiment.

FIG. 1 illustrates an electrical configuration of the portable printer 1 of the present embodiment. The printer 1 is a portable printing apparatus that can be carried, for example, and prints image data of a print job received via wired communication or wireless communication with a PC or a smartphone on a predetermined sheet (such as thermal paper). The printer 1 includes a CPU 12, a RAM 13, a ROM 14, an NVRAM 15, an image forming unit 16, a USB connection unit 19, a user interface 20, a communication unit 24, a power controller 25, a power source unit 27, and the like. The CPU 12 and the like are connected to each other via a bus 11.

The ROM 14 is a nonvolatile memory such as a flash memory, for example and stores various programs such as a control program 41. For example, the CPU 12 executes the control program 41 read from the ROM 14 and activates the system of the printer 1. The NVRAM 15 is a nonvolatile memory. The NVRAM 15 stores history information 43 and image data 45. The data storage destination described above is an example. For example, the control program 41 may be stored in the NVRAM 15. The history information 43 may be stored in the ROM 14. The storage unit that stores the control program 41 may be a computer-readable storage medium. As a computer-readable storage medium, a recording medium such as a CD-ROM or DVD-ROM may be employed in addition to the above example.

The control program 41 is, for example, firmware that comprehensively controls each unit of the printer 1. The CPU 12 executes the control program 41 and controls each unit connected via the bus 11 while temporarily storing the executed processing result in the RAM 13. As will be described later, the history information 43 is information storing the number of disconnections of the external device with respect to the USB connection unit 19 (see FIG. 8). The image data 45 is, for example, image data of a print job received via wired communication or wireless communication with a PC, a smartphone, or the like.

The image forming unit 16 includes, for example, a line-type thermal head 47 and prints an image on a sheet by a direct thermal method based on the control of the CPU 12. The image forming unit 16 rotates a platen roller 48 provided to face the thermal head 47 and conveys the sheet. For example, when a sheet is inserted into the insertion port of the printer 1 at the start of printing, the inserted sheet is guided to the opposed portion of the platen roller 48 and the thermal head 47 and is discharged from the discharge port after printing is completed.

The USB connection unit 19 is an interface that performs communication and power transfer in conformity with, for example, the USB power delivery (PD) standard. The USB connection unit 19 includes, for example, three receptacles 51 as connectors. The USB connection unit 19 performs data communication and power transfer with various external devices connected to the receptacle 51. As an external device to be connected, for example, various devices that is configured to be connected according to the USB standard such as a smartphone, a personal computer, a notebook computer, an external hard disk, a USB memory, and a card reader may be adopted.

The receptacle 51 is, for example, a connector that conforms to the USB Type-C standard. Each receptacle 51 includes a plurality of pins for performing data communication and power transfer. For example, the receptacle 51 includes, as a plurality of pins, a TX pin, an RX pin, a D pin, a Vbus, a CC pin, a ground pin, and the like in a USB Type-C standard connector. A pin may also be referred to as a signal line. The receptacle 51 performs data communication by using, for example, any one of the TX pin, the RX pin, and the D pin. The D pin is, for example, a Data pin and indicates D+/D−. The receptacle 51 also supplies power and receives power by using the Vbus pin.

The CC pins are pins used for determining a power role, for example, and are provided with CC1 pins and CC2 pins corresponding to the front and back of the plug connected to the receptacle 51. Each receptacle 51 has a dual role power (DRP) function that may be switched to a power source that is a power role that supplies power or a power sink that is a power role that receives power.

The power controller 25 controls transmission/reception of power and transmission/reception of data via the USB connection unit 19. The power controller 25 determines a power role based on the connection state of the CC pin when an external device is connected to each receptacle 51 and executes a negotiation for receiving power. The negotiation here is, for example, processing for setting a power source or a power sink, setting an amount of power to be transferred, and the like. Specifically, one of the CC pin CC1 and CC2 pin is used as a configuration channel (CC) according to the front and back of the plug of a USB cable connected to the receptacle 51, and the other is used for VCONN transmission. The CC1 pin and the CC2 pin are connected to a pull-up resistor (power source) and a pull-down resistor (ground) through a switch. The CC1 pin and the CC2 pin are switched between a pull-up state connected to the power source and a pull-down state connected to the ground by switching the switches.

For example, when an external device is connected to the receptacle 51, if the power controller 25 detects that the potential of the CC pin (pin that functions as CC among CC1 and CC2) is a potential in a pull-up state, the power controller 25 causes the receptacle 51 to function as a power source. The power controller 25 executes a negotiation such as setting of the amount of power to be supplied for the supply of power via the Vbus pin of the receptacle 51. Similarly, when an external device is connected to the receptacle 51, the power controller 25 detects that the potential of the CC pin is a pull-down potential and causes the receptacle 51 to function as a power sink. The power controller 25 negotiates power reception via the receptacle 51.

As described above, the receptacle 51 may cause each receptacle 51 to function as both a power host and a power sink by periodically switching the switches. The power controller 25 determines a power role based on the potential of the CC pin when connected. Therefore, in the printer 1 of the present embodiment, the power role of each receptacle 51 is determined at random in an initial state where an external device is connected.

As illustrated in FIG. 1, the power controller 25 includes a memory 26. The memory 26 stores a program PG. The power controller 25 includes a processing circuit such as a CPU and executes control of the power source unit 27 and the like by executing the program PG in the processing circuit. The memory 26 is configured by combining, for example, RAM, ROM, flash memory, and the like.

The power source unit 27 functions as a power source for each device in the printer 1 and supplies power to each device. The power source unit 27 includes, for example, a power cord 28, an AC/DC circuit 29, a DC/DC circuit 30, a battery 31, and the like. The AC/DC circuit 29 converts the AC voltage received from the AC power source into a DC voltage via the power cord 28. The DC/DC circuit 30 may transform a DC voltage supplied from the AC/DC circuit 29 or the battery 31 into a DC voltage having a desired voltage value to supply power to each device in the printer 1. Therefore, the printer 1 may be driven by the battery 31 even when the AC power source is not connected. The power source unit 27 may charge the battery 31 with the power generated by the AC/DC circuit 29 and the power received from the external device via the USB connection unit 19. The power source unit 27 supplies power to the external device via the USB connection unit 19.

The power source unit 27 may switch the power source path for connecting the AC/DC circuit 29, the DC/DC circuit 30, the battery 31, and the like based on the control of the power controller 25, for example. The power controller 25 controls the power supply unit 27 to switch between a power source apparatus that supplies power to each apparatus in the printer 1, a power source apparatus that supplies charging power to the battery 31, and a power supply apparatus that supplies power to external devices via the USB connection unit 19. The main body that controls the power source unit 27 is not limited to the power controller 25 but may be the CPU 12.

The user interface 20 is, for example, a touch panel and includes a liquid crystal panel, a light source such as an LED that emits light from the back side of the liquid crystal panel, a contact sensing film bonded to the surface of the liquid crystal panel, and the like. The user interface 20 receives an operation on the printer 1 and outputs a signal corresponding to the operation input to the CPU 12. The user interface 20 displays information related to the printer 1. The user interface 20 changes the display content of the liquid crystal panel based on the control of the CPU 12.

The communication unit 24 may perform wired communication and wireless communication. The printer 1 receives a print job from the communication unit 24 via a wired LAN or wireless communication. The CPU 12 controls the communication unit 24 and receives a print job (such as image data 45) via wired communication or wireless communication. The printer 1 may receive a print job through data communication of the USB connection unit 19. The CPU 12 executes printing by the image forming unit 16 based on the received print job.

2. Control for Determining Power Source

Next, control for determining the power source by the printer 1 of the present embodiment will be described with reference to FIGS. 2 to 4. For example, when the printer 1 is powered on, the CPU 12 executes the control program 41 stored in the ROM 14 and starts control for determining the power source illustrated in FIGS. 2 to 4 after starting the system of the printer 1. In the following description, the CPU 12 that executes the control program 41 may be simply described as the CPU 12. For example, the description "CPU 12 is" may mean "CPU 12 that executes the control program 41 is". The flowchart of the present specification basically illustrates the processing of the CPU 12 according to instructions described in the program. That is, processes such as "determination", "setting", and "start" in the following description represent processing of the CPU 12. The processing by the CPU 12 includes hardware control. The control illustrated in FIGS. 2 to 4 may be executed by a device other than the CPU 12. For example, the power controller 25 may execute the control illustrated in FIGS. 2 to 4 by executing the program PG.

Here, as described above, the printer 1 may receive power from an external device connected to the USB connection unit 19. Therefore, when a plurality of external devices capable of supplying power are connected, it is preferable that the printer 1 sets an external device suitable as a power source from among the plurality of external devices and executes a negotiation with the external device for receiving power. On the other hand, the CPU 12 according to the present embodiment executes the control illustrated in FIGS. 2 to 4 to set an appropriate external device as a power source from a plurality of external devices and execute a negotiation.

Figure 5:
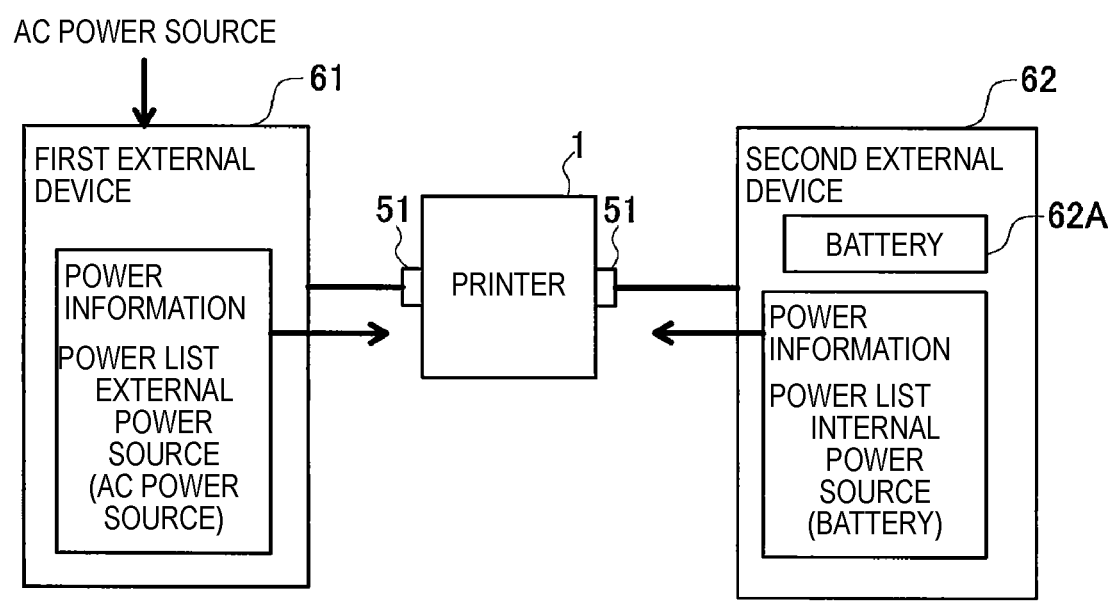
FIG. 5 is a diagram illustrating an example of a connection form.

In the following description, as an example, a case where two external devices, a first external device 61 and a second external device 62, are connected as illustrated in FIG. 5 will be described. As illustrated in FIG. 5, the first external device 61 is connected to an AC power source. The first external device 61 is, for example, a personal computer. The second external device 62 is not connected to an AC power source, but includes a battery 62A. The second external device 62 is, for example, a mobile terminal. In the following description, external devices including the first and second external devices 61 and 62 are collectively referred to as an external device.

First, in step (hereinafter, simply referred to as "S") 11 of FIG. 2, the CPU 12 of the printer 1 determines whether a new connection of the external device to the receptacle 51 of the USB connection unit 19 has been detected. The CPU 12 repeatedly executes the determination processing of S11 until a new connection is detected (S11: NO). For example, it is assumed that the printer 1 is turned on in a state where the first external device 61 and the second external device 62 illustrated in FIG. 5 are connected to each other. The CPU 12 detects the connection of the first and second external devices 61 and 62 that have been connected since startup as a new connection. That is, the CPU 12 detects a connection of two external devices as a new connection. The CPU 12 determines that a new connection of an external device to the receptacle 51 has been detected (S11: YES), and executes S13. The case where one external device is connected and another external device is connected later will be described later (see FIGS. 9 to 11).

In S13, the CPU 12 receives power information from the external device of which a connection is detected. This power information is information on the power source of the external device and is information required in the selection processing (S15) described later. For example, the CPU 12 transmits a Get_Source_Cap message defined by the USB PD standard to each of the first and second external devices 61 and 62. When receiving the Get_Source_Cap message, each of the first and second external devices 61 and 62 returns a Source_Capabilities message indicating power source information.

The Source_Capabilities message includes, for example, power source information indicating a power list. The power list here is information indicating a combination of a voltage value and a current value that may be supplied by the external device as a power source. For example, in the power transfer according to the USB PD standard, power may be supplied from the power source in the range of power from 2.5 W (5 V, 0.5 A) to 100 W (20 V, 5 A). The power list is information indicating combinations of voltage values and current values that may be supplied by each of the first and second external devices 61 and 62 within the range of the power amount.

Figure 6:
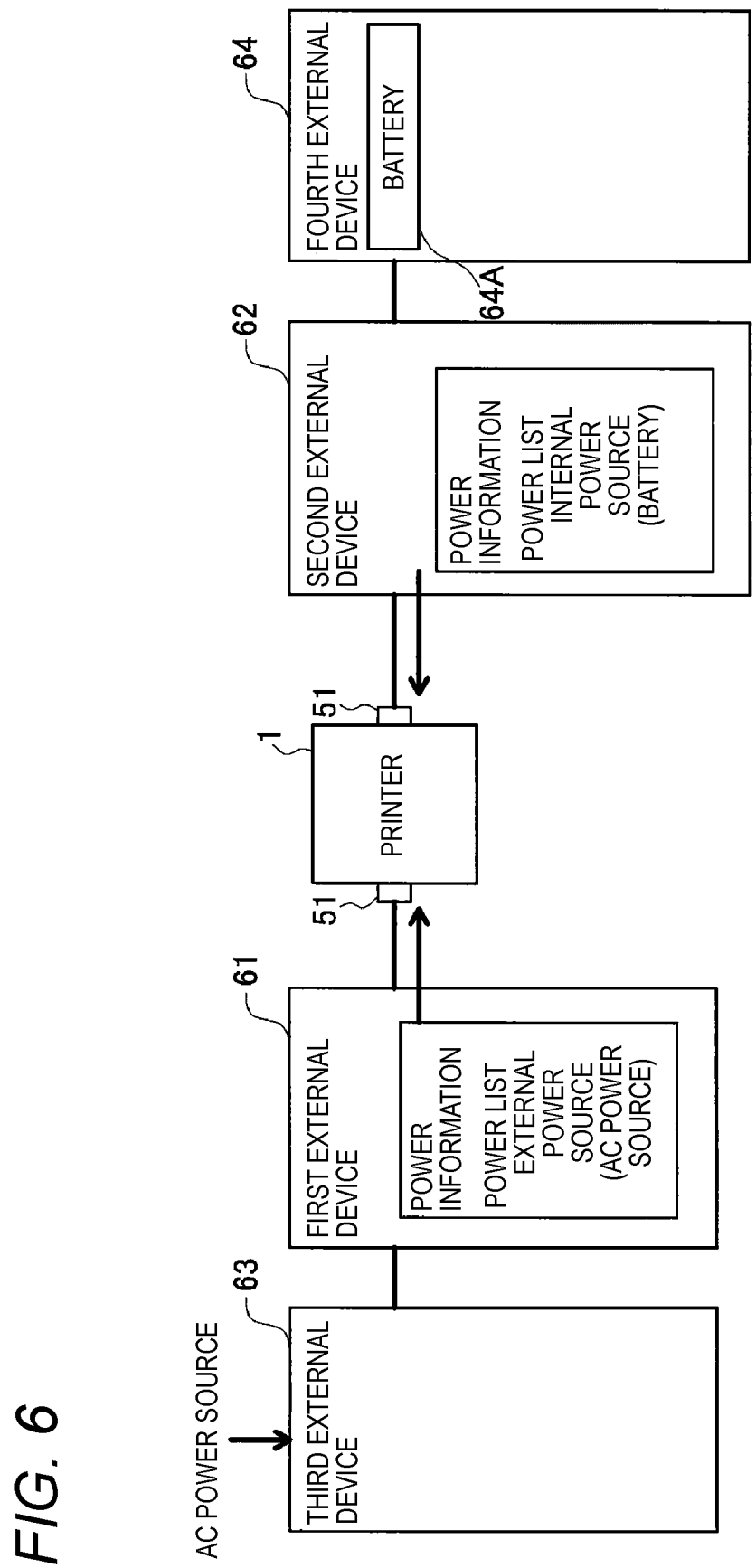
FIG. 6 is a diagram illustrating an example of the connection form.

The Source_Capabilities message includes, for example, power source information indicating whether an external device is connected to an external power source such as an AC power source. The external power source here is a device that supplies power to the printer 1 from the outside such as an AC power source. As illustrated in FIG. 6 to be described later, even when not directly connected to AC power, the external device indirectly connected to an external power source returns information indicating that the external device is connected to the external power source as the power source information of the Source_Capabilities message. The Source_Capabilities message includes, for example, power source information indicating whether the external device includes an internal power source such as a battery.

The method for receiving the power information is not limited to the method for transmitting and receiving the Get_Source_Cap message (Source_Capabilities message). The power source information may be received by another message, such as a Source_Capabilities_Extended message or a Status message. Alternatively, power source information may be received by communication with a printer driver operating on the external device side, for example, other than communication conforming to the USB PD standard. As described above, in the printer 1 of the present embodiment, the power role of each receptacle 51 is determined at random in an initial state where an external device is connected. Therefore, when the CPU 12 needs to become a power sink in order to receive a message for receiving power information, the CPU 12 may execute a role swap for switching the power role with the external power source before starting the processing for receiving power source information. For example, when the own device is set as the power source, the CPU 12 may transmit a swap request to the external power source and switch the power role between the own device and the external power source.

When the CPU 12 receives the power information in S13, the CPU 12 executes the selection processing in S15. In the selection processing, the CPU 12 sets a transmission destination to transmit a power request to, that is, an external device to execute a negotiation with for receiving power among the first and second external devices 61 and 62 based on the power information received in S13. FIGS. 3 and 4 illustrate the contents of the selection processing. When the CPU 12 starts the selection processing, first, the CPU 12 determines whether the power lists of the first and second external devices 61 and 62 received in S13 satisfy power combination conditions required by the own device in S41 of FIG. 3. The printer 1 transforms the power received from the external device by the power source unit 27 to use the power as the own power thereof. Therefore, the power (voltage value or current value) received from the external device needs to be large enough to be used by the power source unit 27 of the own device. In S41, the CPU 12 determines whether there is a combination of a voltage value and a current value that may be used by the own device in the power list of the first external device 61. In S41, the CPU 12 determines whether there is a combination of a voltage value and a current value that may be used by the own device in the power list of the second external device 62.

For example, when there are combinations of usable voltage values and current values in the power lists of both the first and second external devices 61 and 62, the CPU 12 makes a positive determination in S41 (S41: YES), and executes S43. On the other hand, when the CPU 12 determines that there is no combination of usable voltage values and current values in the power lists of at least one of the first and second external devices 61 and 62 (S41: NO), the CPU 12 executes S45.

In S45, the CPU 12 sets one of the first and second external devices 61 and 62 whose power list satisfies the conditions, as an external device to execute negotiation with. Thereby, if one of the two external devices cannot supply a usable voltage value or current value, the external device that supplies a usable voltage value or current value may be set as a negotiation destination. In S45, when both the first and second external devices 61 and 62 do not satisfy the power list, the CPU 12 determines that there is no applicable external device to be negotiated. When executing S45, the CPU 12 ends the selection processing illustrated in FIGS. 3 and 4.

In S43, the CPU 12 determines whether both the first and second external devices 61 and 62 are connected to the external power source based on the power information received in S13. If the CPU 12 determines that both the first and second external devices 61 and 62 are connected to the external power source (S43: YES), the CPU 12 executes S57 of FIG. 4. If the CPU 12 determines that at least one of the first and second external devices 61 and 62 is not connected to an external power source (S43: NO), the CPU 12 executes S47.

In S47, the CPU 12 determines whether both the first and second external devices 61 and 62 are connected to the external power source. That is, the CPU 12 determines whether both of the two external devices are connected to the external power source. If the CPU 12 determines that both the first and second external devices 61 and 62 are not connected to an external power source (S47: YES), the CPU 12 executes S48. When the CPU 12 determines that one of the first and second external devices 61 and 62 is not connected to an external power source, in other words, one is connected to the external power source (S47: NO), the CPU 24 executes S49. In S49, the CPU 12 sets an external device connected to the external power source among the first and second external devices 61 and 62 as a negotiation destination. As a result, an external device that is connected to an external power source and is stable in power supply may be set as a negotiation destination. In the example illustrated in FIG. 5, only the first external device 61 is connected to an AC power source (external power source). Here, the CPU 12 makes a negative determination in S47 and sets the first external device 61 as a negotiation destination in S49. After executing S49, the CPU 12 ends the selection processing.

In S48, the CPU 12 determines whether both the first and second external devices 61 and 62 have batteries. If the CPU 12 determines that both the first and second external devices 61 and 62 do not have a battery (S48: YES), the CPU 12 determines that there is no applicable external device as a negotiation destination (S50) and ends selection processing. Therefore, the CPU 12 does not set a negotiation destination when both the first and second external devices 61 and 62 are not connected to the external power source and have no battery.

If the CPU 12 determines that at least one of the first and second external devices 61 and 62 has a battery (S48: NO), it the CPU 12 executes S51. In S51, the CPU 12 determines whether or not both the first and second external devices 61 and 62 have batteries. If the CPU 12 determines that both the first and second external devices 61 and 62 have batteries (S51: YES), the CPU 12 executes S52. If the CPU 12 determines that one of the first and second external devices 61 and 62 has a battery (S51: NO), the CPU 12 executes S53.

In S53, the CPU 12 sets an external device having a battery among the first and second external devices 61 and 62 as a negotiation destination. As a result, if one of the two external devices is not connected to an external power source and does not have a battery, the CPU 12 sets the other external device that has a battery that is not connected to an external power source but has a battery as a negotiation destination. When executing S53, the CPU 12 ends the selection processing.

When executing S52, both the first and second external devices 61 and 62 have batteries. The CPU 12 determines whether the remaining capacity of the battery of the first external device 61 is larger than the remaining capacity of the battery of the second external device 62 (S52). For example, the CPU 12 is configured to detect the remaining capacity of the battery of each of the first and second external devices 61 and 62 by transmitting a Get_Battery_Status message to both the first and second external devices 61 and 62 and receiving a Battery_Status message.

When the CPU 12 determines that the remaining battery capacity of the first external device 61 is larger than the remaining battery capacity of the second external device 62 (S52: YES), the CPU 12 sets the first external device 61 as a negotiation destination (S54). If the CPU 12 makes a negative determination in S52 (S52: NO), the CPU 12 sets the second external device 62 to a negotiation destination (S55). Therefore, the CPU 12 sets an external device having a larger remaining battery capacity as the negotiation destination. Thereby, an external device that may supply more stable power may be set as a negotiation destination. When executing S54 or S55, the CPU 12 ends the selection processing.

The CPU 12 may set a negotiation destination under conditions other than the remaining battery capacity. For example, when both the first and second external devices 61 and 62 are not connected to an external power source, the CPU 12 may set an external device of which a connection to the receptacle 51 is first detected among the first and second external devices 61 and 62, as a negotiation destination. Alternatively, the CPU 12 may set an external device having a smaller number of disconnections as a negotiation destination as in S58 (see FIG. 4) described later.

Figure 4:
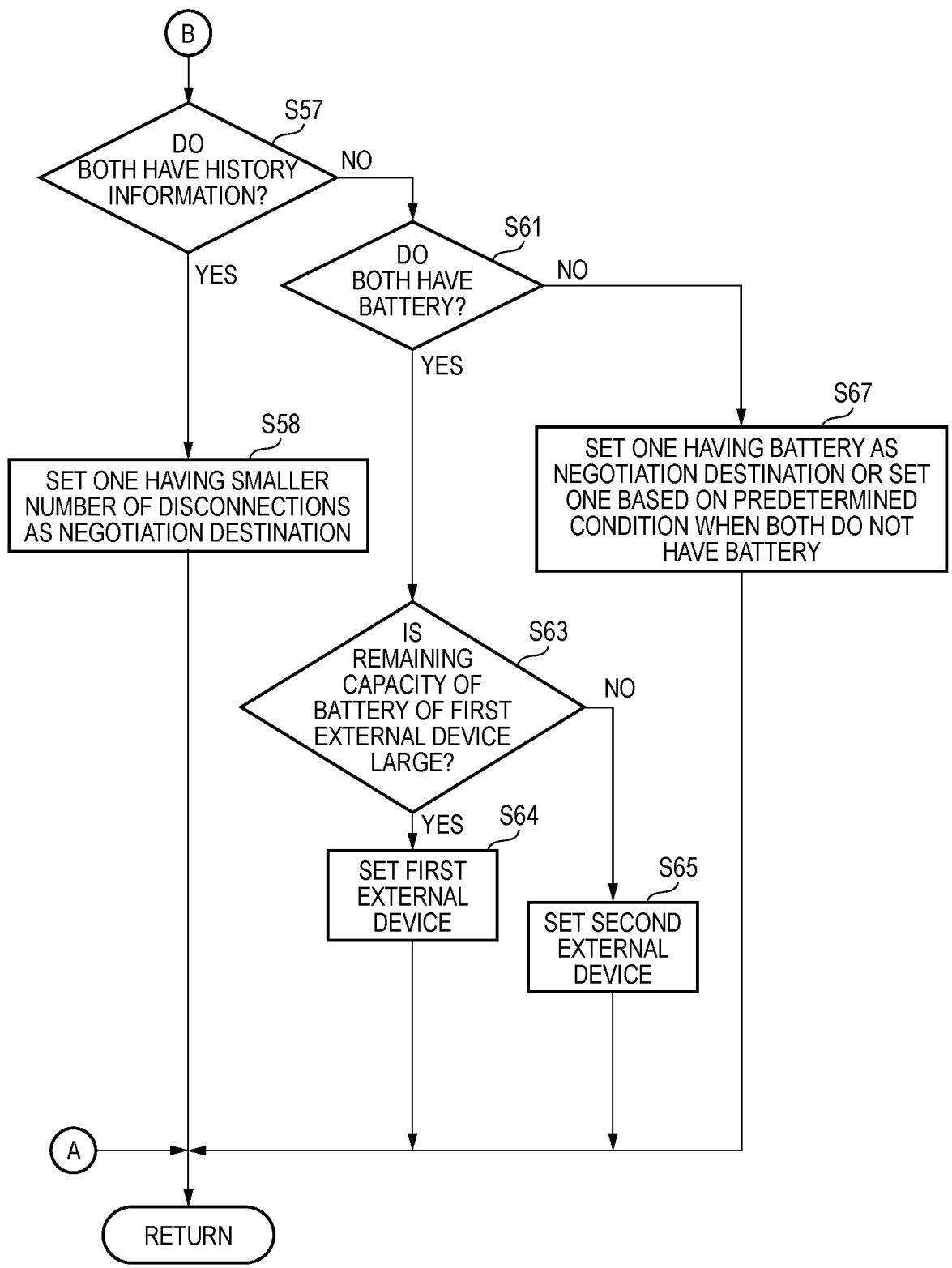
FIG. 4 is a flowchart illustrating the contents of selection processing.

Next, in S57 of FIG. 4, the CPU 12 determines whether information of both the first and second external devices 61 and 62 is stored in the history information 43. FIG. 8 illustrates the contents of the history information 43. As illustrated in FIG. 8, the history information 43 stores a vendor ID, a product ID, the number of disconnections of the USB connection, and the number of disconnections of the external power source in association with each other. For example, when a new external device is connected to the receptacle 51, the CPU 12 requests device information from the newly connected external device by a plug and play (PnP) function. The device information includes information such as the vendor ID and product ID of the manufacturer of the external device. The CPU 12 stores the received vendor ID and product ID in the history information 43. When the CPU 12 detects that the external device is disconnected from the receptacle 51, the CPU 12 increases the number of disconnections of USB connection corresponding to the vendor ID and product ID of the external device by one. Thereby, the CPU 12 may store the number of disconnections of the USB connection in each external device in the history information 43.

When the connection to an external device is disconnected due to a change in the status of the printer 1, such as when the printer 1 is powered off, or when the printer 1 has transitioned to a mode that disconnects the USB connection unit 19, it is preferable that the CPU 12 does not increase the number of disconnections even when the USB connection is disconnected. Such a disconnection is not performed in response to a request from an external device, but is performed at the convenience of the printer 1, it is preferable not to include the disconnection in the number of disconnections in order to appropriately determine the stability of the power supply of the external device. The CPU 12 may initialize the information of the history information 43 every predetermined period. The predetermined period may be changed based on an operation input from a user or the like.

In the USB PD standard, when an external power source is disconnected from an external device, information indicating that the external power source is disconnected may be transmitted to the external device. Therefore, when the CPU 12 receives information on the disconnection of the external power source from the external device, the CPU 12 may increase the number of disconnections of the external power source associated with the product ID or the like of the corresponding external device to store the number of disconnections of the external power source in the external device in the history information 43. The method of monitoring the number of disconnections of an external power source is not limited to the method of receiving the information indicating the disconnection described above. For example, when the CPU 12 receives the power information of the connected external device and detects the disconnection of the external power source based on the received power information, the CPU 12 may increase the number of disconnections of the external power source in the history information 43.

If the CPU 12 determines in S57 of FIG. 4 that the information of both the first and second external devices 61 and 62 is stored in the history information 43 (S57: YES), the CPU 12 executes S58. That is, if both the first and second external devices 61 and 62 have been connected once in the past and then disconnected, and the history information 43 remains, the CPU 12 executes S58. In S58, the number of disconnections is determined based on the history information 43, and an external device having a small number of disconnections is set as a negotiation destination. For example, the CPU 12 sets, as a negotiation destination, an external device having a small total number of disconnections obtained by adding the number of disconnections of the USB connection and the number of disconnections of the external power source. In the example illustrated in FIG. 8, the number of disconnections (11 times=5±6) of the external device with the vendor ID "0003" is smaller than the number of disconnections (13 times=10±3) of the external device with the vendor ID "0001". Thus, the CPU 12 sets the external device with the vendor ID "0003" having a small number of disconnections as a negotiation destination. The CPU 12 may set a negotiation destination based on either one of the number of disconnections of the USB connection and the number of disconnections of the external power source.

Here, an external device having a small number of disconnections has a more stable connection state with the printer 1 or a more stable connection state with an external power source. Therefore, the CPU 12 may set an external device that is stable in power supply as a negotiation destination by setting an external device having a smaller number of disconnections as a negotiation destination. When executing S58, the CPU 12 ends the selection processing.

If the CPU 12 determines in S57 that information of at least of the first and second external devices 61 and 62 is not stored in the history information 43 (S57: NO), the CPU 12 executes S61. For example, if one of the first and second external devices 61 and 62 has never been connected in the past, the CPU 12 executes S61. In S61, the CPU 12 determines whether both the first and second external devices 61 and 62 have batteries. If the CPU 12 determines that both the first and second external devices 61 and 62 have batteries (S61: YES), the CPU 12 executes S63.

Figure 3:
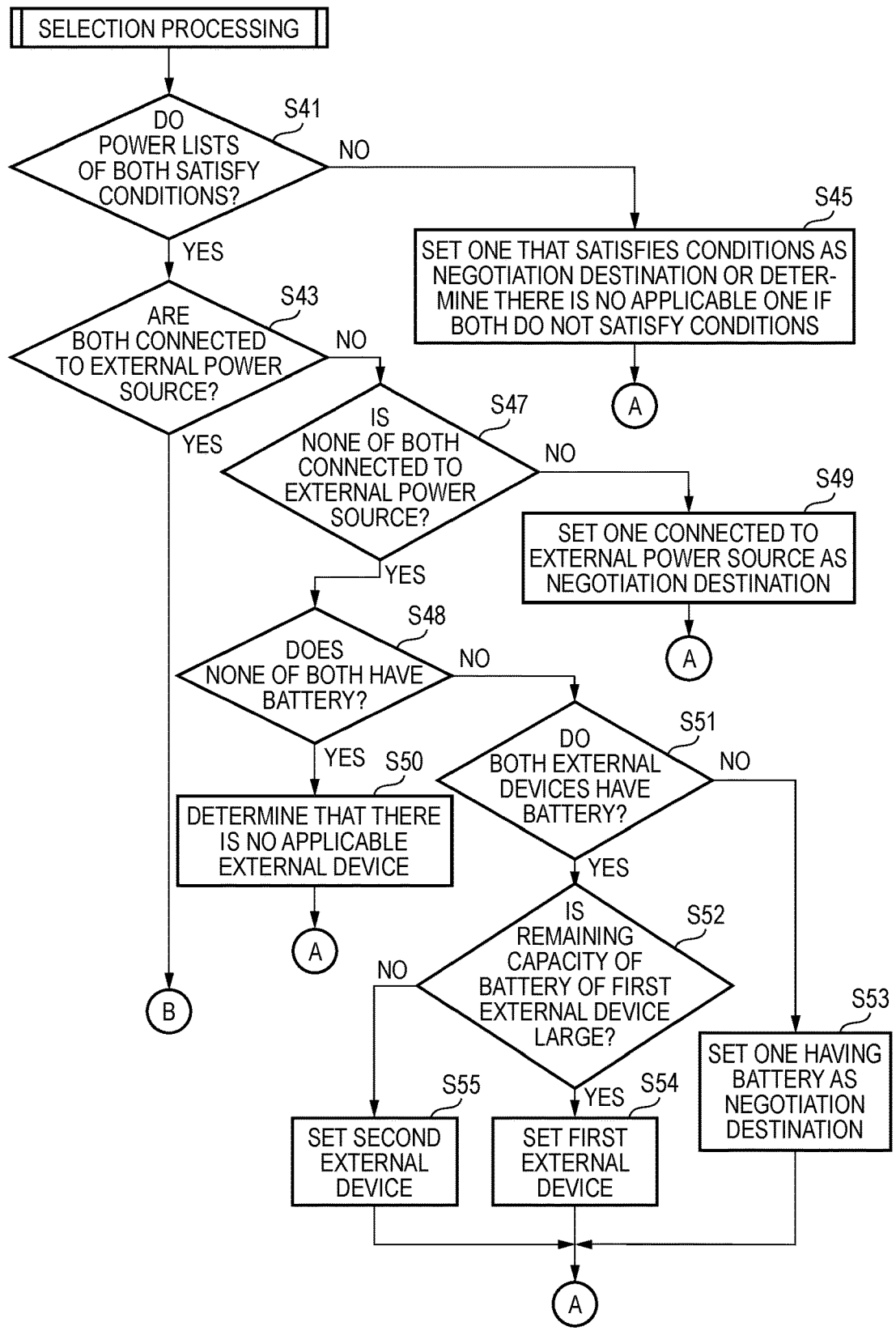
FIG. 3 is a flowchart illustrating the contents of selection processing.

In S63, the CPU 12 determines whether the remaining amount of the battery of the first external device 61 is greater than the remaining amount of the battery of the second external device 62, as in S52 of FIG. 3. If the CPU 12 makes a positive determination in S63 (S63: YES), the first external device 61 is set as the negotiation destination (S64), and if a negative determination is made in S63 (S63: NO), the second external device 62 is set as the negotiation destination (S65). That is, the CPU 12 sets an external device having a large remaining battery capacity as a negotiation destination. When executing S64 or S65, the CPU 12 ends the selection processing. The determination criterion in S63 is not limited to the remaining battery capacity as in S52 of FIG. 3. For example, the CPU 12 may set an external device of which a connection to the USB connection unit 19 is first detected or an external device having a smaller number of disconnections as a negotiation destination.

If the CPU 12 determines that at least one of the first and second external devices 61 and 62 does not have a battery (S61: NO), the CPU 12 executes S67. The CPU 12 sets an external device having a battery as a negotiation destination (S67). When both the first and second external devices 61 and 62 do not have a battery, the CPU 12 sets an external device as a negotiation destination based on a predetermined condition. As a predetermined condition, the CPU 12 may set, for example, an external device of which a connection is first detected as a negotiation destination (S67). When executing S67, the CPU 12 ends the selection processing.

Figure 2:
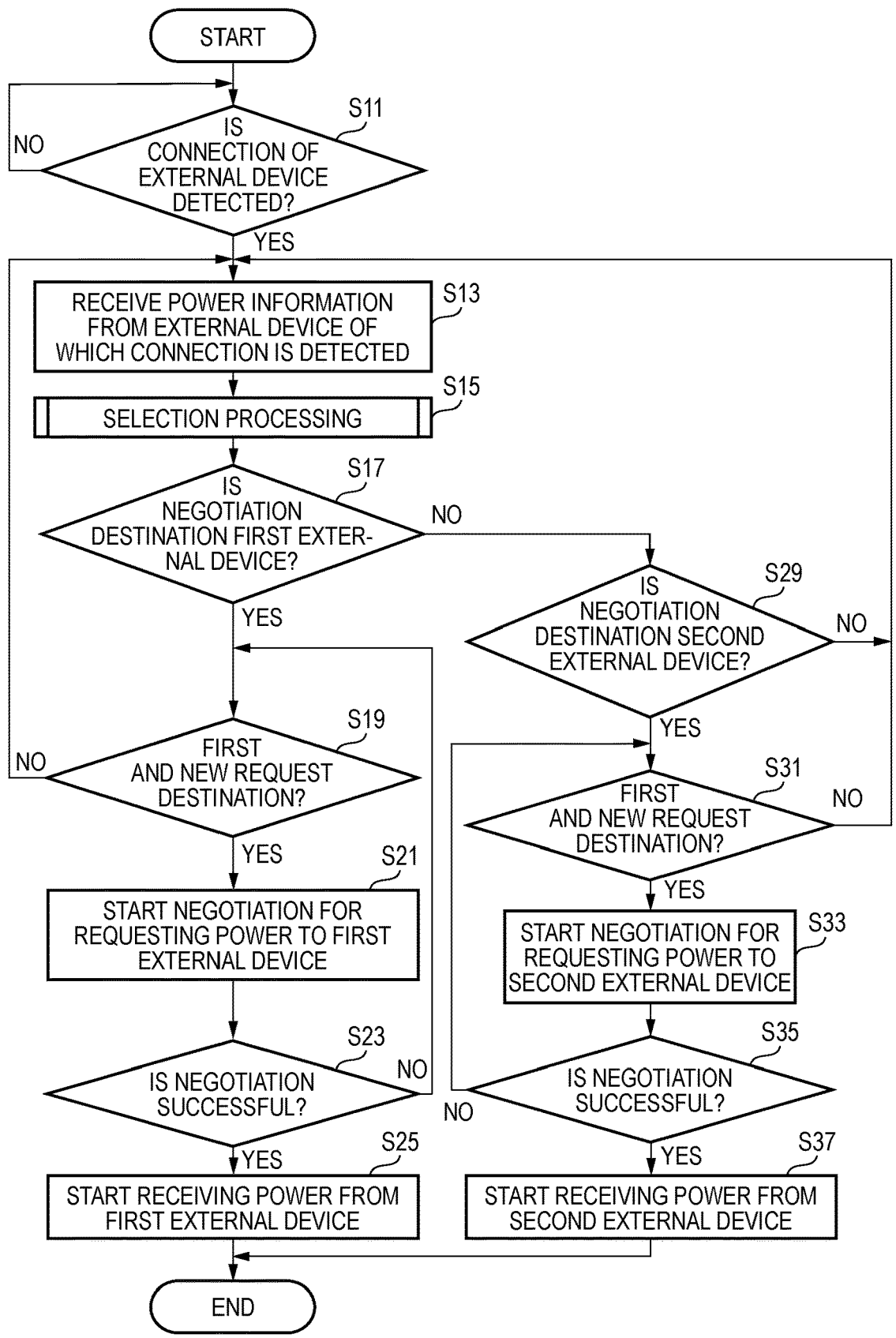
FIG. 2 is a flowchart illustrating the contents of control for determining a power source.

As illustrated in FIG. 2, when the selection processing of S15 is completed, the CPU 12 executes the processing after S17 and executes a negotiation with the external device set as a negotiation destination in S15. In S17, the CPU 12 determines whether the first external device 61 is set as a negotiation destination in the selection processing in S15. If the CPU 12 determines that the first external device 61 has been set (S17: YES), the CPU 12 executes S19, and if the CPU 12 determines that the first external device 61 has not been set (S17: NO), the CPU 12 executes S29.

In S19, the CPU 12 determines whether the processing of S19 is executed for the first time after the processing of S13 is executed. In S19, the CPU 12 determines whether the first external device 61 that is the negotiation destination is a new negotiation destination (power request destination). As described above, the example illustrated in FIG. 5 is a case where both the first and second external devices 61 and 62 are connected when the printer 1 is powered on. However, the printer 1 may be connected to the first external device 61 first and the second external device 62 later, for example. Here, the printer 1 may be receiving power from the first external device 61 connected first. That is, the first external device 61 has been negotiated and may not be a new external device to execute a negotiation with. Here, the CPU 12 determines in S19 that the first external device 61 is not a new negotiation destination (S19: NO). An example in which an external device is connected later will be described later with reference to FIGS. 9 to 11.

When the CPU 12 determines in S19 that it is the first execution and the first external device 61 is a request destination for a new negotiation (S19: YES), the CPU 12 starts a negotiation for requesting power with the first external device 61 (S21). The CPU 12 controls the power controller 25 to transmit a power request for requesting power of a necessary voltage value and current value to the first external device 61. The voltage value and current value are a combination for which suitability is determined in S41 of FIG. 3. If the printer 1 side is set as a power source when transmitting the power request, the CPU 12 executes a role swap for switching the power role with the first external device 61 and transmits a power request after setting the own device as a power sink.

Next, in S23, the CPU 12 determines whether the negotiation with the first external device 61 started in S21 is successful. When the CPU 12 determines that the negotiation is successful (S23: YES), the CPU 12 starts receiving necessary power from the first external device 61 (S25). Thereby, it is possible to receive power from an external device that is connected to an external power source and has stable power supply. After executing S25, the CPU 12 executes the processing from S11 again. Thereby, every time a connection of a new external device is detected, an appropriate negotiation destination may be set and a power request may be transmitted.

The CPU 12 determines that the negotiation has failed, for example, when the requested power is not supplied from the first external device 61 or when the first external device 61 does not respond to the role swap serving as a power source (S23: NO), the CPU executes S31. Thus, when the negotiation with the first external device 61 fails, the CPU 12 may execute the negotiation with the second external device 62 that is another external device.

In S29, the CPU 12 determines whether the second external device 62 has been set as a negotiation destination in the selection processing in S15. When determining that the second external device 62 has been set (S29: YES), the CPU 12 executes S31. On the other hand, when the CPU 12 has not set the second external device 62, that is, when the CPU 12 sets the second external device as "not applicable" as a negotiation destination (S29: NO), the CPU 12 executes the processing from S13 again. As a result, when there is no external device suitable as a power source, the CPU 12 executes the processing from S13 again. For example, when the power supply configuration of the first and second external devices 61 and 62 is changed and the power source information is updated, a negotiation with the changed external device may be executed. For example, when an external device that satisfies the conditions of the selection processing in FIGS. 3 and 4 appears, such as when the external device is later connected to an external power source, a negotiation with the external device may be executed.

In S31, as in S19, the CPU 12 determines whether the processing of S31 is executed for the first time after the processing of S13 is executed and the second external device 62 is a new negotiation destination (not already negotiated). When the CPU 12 determines in S31 that it is the first execution and the second external device 62 is a new negotiation destination (S31: YES), as in S21 to S25, the CPU 12 transmits a power request to the second external device 62 (S33) and when the negotiation is successful (S35: YES), receives power from the second external device 62 (S37). Thereby, power may be received from a more appropriate external device.

When the negotiation with the second external device 62 fails (S35: NO), the CPU 12 executes S19 and executes a negotiation with the first external device 61. On the other hand, if a negative determination is made in S19 (S19: NO) or a negative determination is made in S31 (S31: NO), the CPU 12 executes the processing from S13 again. Here, the CPU 12 is in a state where the negotiation with both the first and second external devices 61 and 62 has failed. Here, when the power supply configuration of the first and second external devices 61 and 62 is changed by executing the processing from S13 again and the power source information is updated, the CPU 12 executes a negotiation with the changed external device. Thus, the CPU 12 of the present embodiment may set an appropriate negotiation destination based on the power source information and may request power.

If the CPU 12 executes S13 again, the CPU 12 resets the number of times that S19 and S31 are executed to zero. As a result, the CPU 12 executes a negotiation with the first and second external devices 61 and 62 again. When the processing after S13 is repeated a predetermined number of times or more, that is, when the selection processing (S15) is executed many times based on the power source information, the CPU 12 may once end the control illustrated in FIGS. 2 to 4 and execute the processing from S11 again. As a result, the CPU 12 may execute determination processing or the like for a newly connected external device.

Next, what kind of negotiation the CPU 12 is to execute in the case of each connection configuration of FIGS. 5 to 7 will be described. In the case illustrated in FIG. 5, as described above, the CPU 12 determines that only the first external device 61 is connected to an external power source (AC power source) (S47: NO) and executes a negotiation with the first external device 61. Here, the CPU 12 gives priority to the negotiation with the first external device 61 connected to the AC power source, rather than the second external device 62 having the battery 62A.

In the example illustrated in FIG. 6, both the first and second external devices 61 and 62 are not directly connected to the AC power source and have no battery. However, the first external device 61 is connected to a third external device 63 connected to the AC power source and may receive power from the third external device 63 by USB PD connection. The second external device 62 is connected to a fourth external device 64 having a battery 64A and may receive power from the fourth external device 64 through USB the PD connection.

When the first external device 61 is not directly connected to the AC power source but is connected to an external power source via the third external device 63, the first external device 61 returns the Source_Capabilities message in which information indicating that the first external device is connected to an external power source is set. When the second external device 62 does not have the battery 64 but is indirectly connected to the battery 64A via the fourth external device 64, the second external device 62 returns the Source_Capabilities message in which information indicating that the second external device has a battery is set. Therefore, even in such a connection configuration in which the external device is indirectly connected, similarly to the connection configuration of FIG. 5, the CPU 12 may set the first external device 61 indirectly connected to the AC power source as a negotiation destination based on the power source information received from the first and second external devices 61 and 62. Therefore, the CPU 12 of the present embodiment may appropriately determine a negotiation destination not only when the external device is connected directly to an external power source or has a built-in internal power source, but also when the external device is connected indirectly to an external power source or internal power source.

This indirectly connected route is a route that does not pass through the printer 1 that has transmitted the Get_Source_Cap message. Therefore, the Source_Capabilities message is set with information indicating whether an external power source exists on the own device side or an internal power source exists with respect to the transmission source of the Get_Source_Cap message. Therefore, for example, even if the second external device 62 is connected to the AC power source via the printer 1 (sender), the first external device 61, and the third external device 63, the second external device 62 returns the Source_Capabilities message indicating that the second external device is not connected to an external power source. The CPU 12 may select an appropriate external device based on the Source_Capabilities message even when indirectly connected to a power source.

As illustrated in FIG. 7, the first external device 61 is connected to an AC power source. The second external device 62 is connected to an AC power source and has the battery 62A. Here, the CPU 12 determines that both the first and second external devices 61 and 62 are connected to the external power source (S43: YES) and sets a negotiation destination based on the number of disconnections in the history information 43 (S58 of FIG. 4). When there is no information in the history information 43, the CPU 12 sets the second external device 62 having the battery 62A as a negotiation destination (S67). Thus, even when both of the two external devices are connected to the external power source, the second external device 62 that is provided with the battery 62A and is more stable in power supply may be set as a negotiation destination.

In the above description, as an example, a case has been described in which both the first and second external devices 61 and 62 are connected when the printer 1 is powered on and both connections are detected. However, when one of the first and second external devices 61 and 62 is connected later, the CPU 12 may execute a negotiation with an appropriate external device. Even when both the first and second external devices 61 and 62 are connected, but there is a new connection to one of the external devices, the CPU 12 may execute a negotiation with an appropriate external device.

Figure 9:
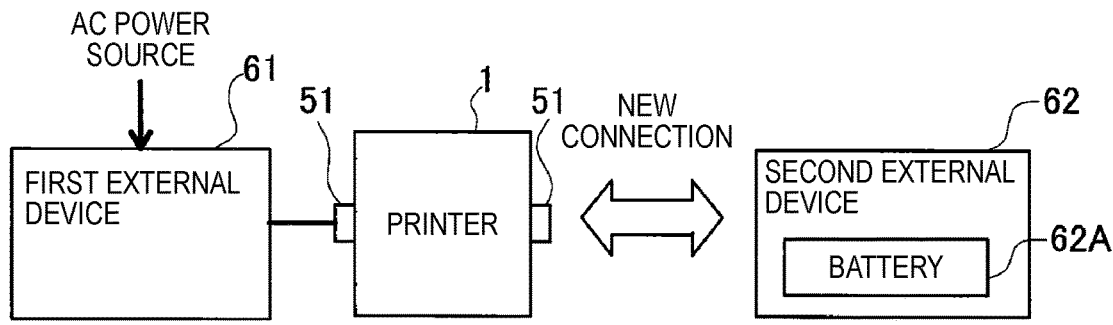
FIG. 9 is a diagram illustrating an example of a connection form in which an external device is connected later.

FIG. 9 illustrates a case where the second external device 62 having the battery 62A is newly connected to the printer 1 that is receiving power from the first external device 61 connected to an AC power source. Here, the CPU 12 makes a positive determination in S11 of FIG. 2 and sets the first external device 61 connected to the external power source as a negotiation destination in S15 (S49). In S19, the CPU 12 determines that the first external device 61 is not a new negotiation destination (S19: NO), and executes the processing from S13. Thereby, even when an external device is connected later, the CPU 12 may set an appropriate negotiation destination based on the power source information. When the processing after S13 are repeatedly executed a predetermined number of times or more, the CPU 12 may end the processing of FIGS. 2 to 4 and execute again from S11.

Figure 10:
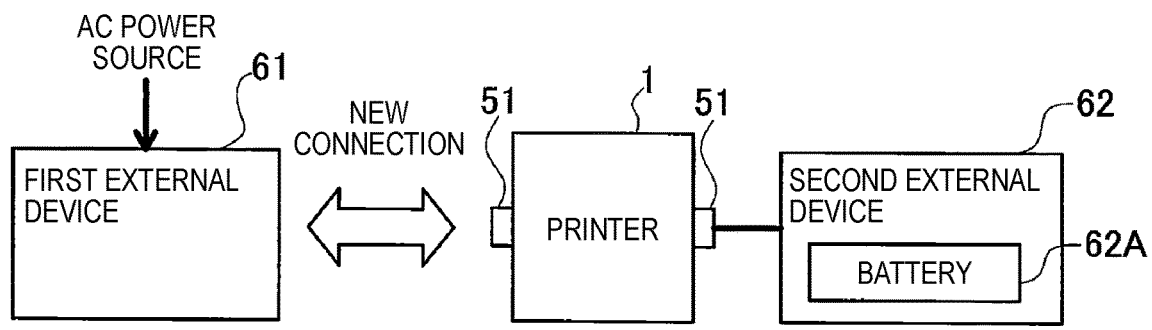
FIG. 10 is a diagram illustrating an example of the connection form in which an external device is connected later.

FIG. 10 illustrates a case where the first external device 61 to which an AC power is connected is newly connected to the printer 1 that is receiving power from the second external device 62 having the battery 62A. Here, the CPU 12 sets the first external device 61 connected to the external power source as a negotiation destination in S15 (S49). In S19, the CPU 12 determines that the first external device 61 is a new negotiation destination (S19: YES), and executes a negotiation with the first external device 61 (S21 to S25). Thereby, even when an external device is connected later, the CPU 12 may set an appropriate negotiation destination based on the power source information.

Figure 11:
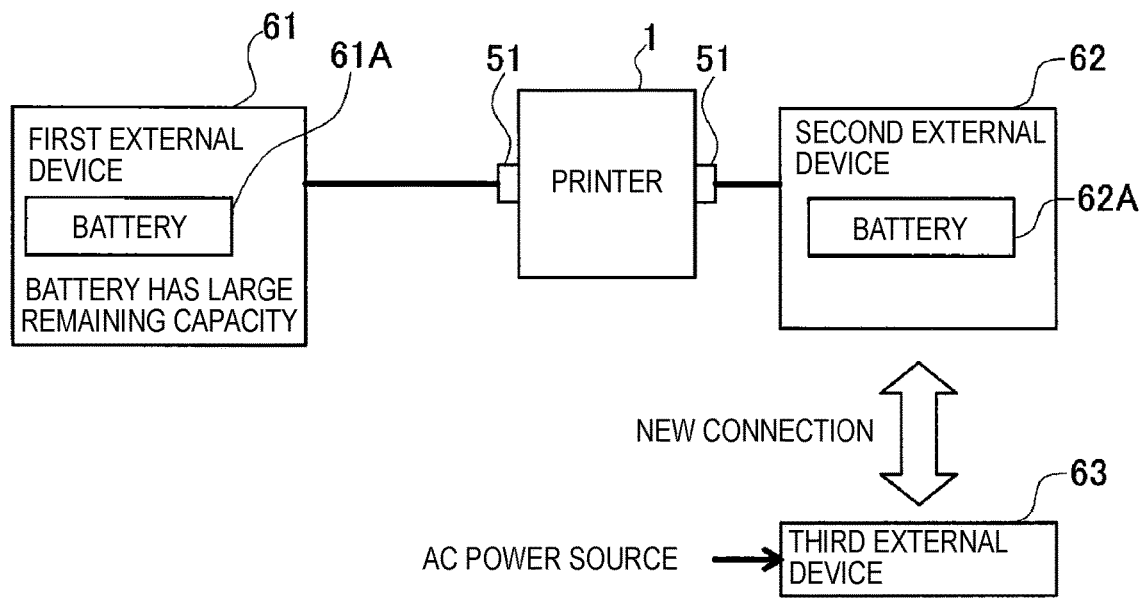
FIG. 11 is a diagram illustrating an example of the connection form in which an external device is connected later.

In FIG. 11, the first external device 61 having the battery 61A and the second external device 62 having the battery 62A are connected to the printer 1. The remaining battery capacity of the battery 61A of the first external device 61 is larger than the remaining battery capacity of the battery 62A of the second external device 62. Therefore, the CPU 12 sets the first external device 61 having a large remaining battery capacity as a negotiation destination in S54 of FIG. 3. The printer 1 is in a state of receiving power from the first external device 61. In this state, the third external device 63 connected to the AC power source is newly connected to the second external device 62.

Here, the second external device 62 is indirectly connected to an external power source via the third external device 63. Accordingly, the second external device 62 transmits a Source_Capabilities message to the printer 1 with information indicating that it the second external device 62 is connected to the external power source, for example, because the power source information of the own device has changed.

For example, the CPU 12 may execute the processing after S13 in FIG. 2 in response to receiving the Source_Capabilities message from the connected second external device 62. For example, the determination condition of S11 in FIG. 2 may include conditions of not only detecting a new connection but also detecting a change in the power source information of the connected external device. Alternatively, the determination condition of S11 may be only the condition of detecting the change in the power source information. Here, when the CPU 12 receives the Source_Capabilities message from the second external device 62 and detects that the power source information of the second external device 62 has been changed (S11: YES), the CPU 12 performs the processing after S13. In S13, the CPU 12 accepts power source information for the first external device 61 as well. In S15, the CPU 12 sets the second external device 62 connected to an external power source as a negotiation destination (S49). As a result, an appropriate negotiation destination may be set even when there is an indirect and new connection with an external power source or a battery.

In the above description, the case where two external devices are connected has been described, but even when three or more external devices are connected, the CPU 12 may appropriately set an external device as a negotiation destination by executing the same control as in FIGS. 2 to 4. For example, when three external devices are connected, the CPU 12 executes the control illustrated in FIGS. 2 to 4 for two of the three external devices to set an external device as a negotiation destination and then executes the control of FIGS. 2 to 4 again for the external device set as the negotiation destination and the remaining external devices. Accordingly, an appropriate external device may be set as a negotiation destination from the three external devices.

The printer 1 is an example of an information processing apparatus. The history information 43 is an example of first and second power source information. The receptacle 51 is an example of a first interface and a second interface. S13 is an example of a first reception process and a second reception process. S15 is an example of a selection process. S21 and S33 are an example of a transmission process.

3. Effect

As described above, according to above-described embodiment, there exist the following effects. (1) The CPU 12 of the printer 1 of the present embodiment executes the processing of S13 (an example of first reception processing) for receiving power source information (an example of first power source information) related to the power source of the first external device 61 connected to the receptacle 51, the processing of S13 (an example of second reception processing) for receiving power information (an example of second power information) of the second external device 62 connected to the receptacle 51, the processing of S15 (an example of selection processing) for selecting an external device to transmit a power request to from among the first and second external devices 61 and 62 based on the power source information, and the processing of S21 and S33 (an example of transmission processing) for transmitting a power request to the selected external device based on the result of the processing of S15.

According to this, the CPU 12 receives power source information for each of the connected first and second external devices 61 and 62. Then, the CPU 12 selects an external device that requires power from the first and second external devices 61 and 62 based on the received power source information. Accordingly, it is possible to select a more appropriate external device for receiving power and transmit a power request.

(2) The CPU 12 executes the processing of S43 (an example of first determination processing) for determining whether both the first and second external devices 61 and 62 are connected to an external power source based on the power source information and the processing of S47 (an example of second determination processing) for determining whether both the first and second external devices 61 and 62 are not connected to an external power source based on the power source information. If the CPU 12 makes a negative determination in S43 and makes a negative determination in S47, the CPU 12 selects an external device connected to an external power source as an external device to transmit a power request to (S49).

According to this, a power request is transmitted to an external device connected to an external power source such as an AC power source or a DC power source. Thereby, it is possible to receive power from an external device that may supply more stable power.

(3) The first external device 61 of the present embodiment may be directly connected to an external power source and receive power from the external power source (FIGS. 5, 7, 9, and 10). According to this, it is possible to stably receive power from the first external device 61 directly connected to the external power source.

(4) The first external device 61 may receive power from the third external device 63 (an example of another external device) that is directly connected to an external power source through a route that does not pass through the printer 1 (an example of an information processing apparatus) (FIG. 6). According to this, the first external device 61 is indirectly connected to an external power source via another external device. According to this, it is possible to stably receive power from the first external device 61 directly connected to an external power source.

(5) The external power source of the present embodiment is an AC power source, for example. According to this, it is possible to receive power from the first external device 61 that may supply more stable power by being connected to the AC power source.

(6) When the CPU 12 determines that the power request is rejected from the first external device 61 (S23: NO), the CPU 12 transmits the power request to the second external device 62 (S33). According to this, when the supply of power from the first external device 61 is rejected, the power request may be transmitted to the other second external device 62 to secure the power.

(7) The CPU 12 receives from the history information 43 (an example of first and second power source information) the number of disconnections indicating a frequency (an example of first insertion/removal frequency, second insertion/removal frequency) at which each of the first and second external devices 61 and 62 is disconnected from the receptacle 51 and selects the first external device 61 as an external device to transmit a power request to when the number of disconnections of the first external device 61 is smaller than the number of disconnections of the second external device 62 (S58).

There is a high possibility that the power supply of external devices with many USB disconnections will not be stable. Therefore, the first external device 61 having a smaller number of disconnections of the USB connection is selected, and a power request is transmitted. As a result, power may be received from the first external device 61 that may supply power more stably.

(8) The CPU 12 may receive from the history information 43 (an example of the first and second power source information) the number of disconnections of an external power source (an of example of third insertion/removal frequency and fourth insertion/removal frequency) indicating a frequency at which the external power source is disconnected from each of the first and second external devices 61 and 62 and select the first external device 61 as an external device to transmit a power request to when the number of disconnections of the external power source from the first external device 61 is smaller than the number of disconnections of the external power source from the second external device 62 (S58).

There is a high possibility that the power supply of an external device having a large number of disconnections from an external power source is not stable. Therefore, the first external device 61 having a smaller number of disconnections from an external power source is selected, and a power request is transmitted. As a result, power may be received from the first external device 61 that may supply power more stably.

(9) The CPU 12 executes the processing of S51 and S61 (third determination processing) for determining whether both the first and second external devices 61 and 62 have the batteries 61A and 62A based on the power source information (the third determination). When the CPU 12 makes a negative determination in the processing of S51 or S61, the CPU 12 selects an external device having the batteries 61A and 62A as an external device to transmit a power request to (S54, S55, S64, and S65). According to this, it is possible to select an external device that has the batteries 61A and 62A and is more stable in power supply as a power source.

(10) If the CPU 12 makes a positive determination in S51 or S61, the CPU 12 executes the processing of S52 and 63 (an example of fourth determination processing) for determining whether the remaining capacity of the battery 61A of the first external device 61 is larger than the remaining capacity of the battery 62A of the second external device 62. When the CPU 12 makes a positive determination in the processing of S52 or S63, the CPU 12 selects the first external device 61 as an external device to transmit a power request to (S54 and S64). According to this, when both the first and second external devices 61 and 62 have the batteries 61A and 62A, it is possible select an external device that is more stable in power supply selected as a power source by selecting the first external device 61 having a larger remaining battery capacity.

(11) The receptacle 51 is an interface (an example of the first and second USB interfaces) that performs communication conforming to the Universal Serial Bus (USB) standard. In the printer 1 having two USB interfaces capable of transmitting and receiving power, when a plurality of external devices are connected, it is necessary to select an appropriate external device for receiving power and to transmit a power request. Therefore, in the printer 1 having two USB interfaces, it is extremely effective to select an external device to request power based on the power source information.

4. Modification Example

Needless to say, the present application is not limited to the above-described embodiment, and various modifications and changes may be made without departing from the spirit of the present disclosure. For example, in the above embodiment, the control illustrated in FIGS. 2 to 4 is executed by the CPU 12, but may executed by other apparatuses. For example, the power controller 25 may execute the control illustrated in FIGS. 2 to 4 by executing the program PG in the memory 26. Here, the power controller 25 is an example of a controller of the present disclosure. The program PG is an example of the program of the present disclosure. The storage unit for storing the history information 43 may not be provided in the printer 1. For example, the CPU 12 may store the history information 43 in an external device such as a server. The communication standard of the first and second interfaces in the present application is not limited to the communication standard of the USB PD standard and may be another communication standard capable of transferring power.

The control contents illustrated in FIGS. 2 to 4 are examples, and the contents and order of each step may be changed as appropriate. For example, the CPU 12 specifies an external device connected to an external power source by determining whether both the first and second external devices 61 and 62 are connected to the external power source in S43 and determining whether both the first and second external devices 61 and 62 are not connected to the external power source in S47. That is, the CPU 12 has determined the two external devices together. However, the CPU 12 may individually perform, for example, processing for determining whether the first external device 61 is connected to an external power source and processing for determining whether or not the second external device 62 is connected to an external power source. Similarly, for S48, S51, and S61, the CPU 12 may similarly determine the presence of a battery for each of the first and second external devices 61 and 62.

In the above embodiment, the CPU 12 is employed as the controller of the present application, but is not limited thereto. For example, at least a part of the controller may be configured with dedicated hardware such as an application specific integrated circuit (ASIC). The controller may be configured to operate by using, for example, software processing and hardware processing together. In the above embodiment, the portable printer 1 is employed as the information processing apparatus of the present application, but is not limited thereto. The information processing apparatus of the present application may be a non-portable stationary printer and is not limited to a printer, and may be a copying apparatus, a fax apparatus, a scanner apparatus, or a camera. The information processing apparatus of the present application may be a multi function device having a plurality of functions.

What is claimed is:
1. An information processing apparatus comprising:
a first interface;
a second interface; and
a controller configured to
receive first power source information related to a power source of a first external device connected to the first interface,
receive second power source information related to a power source of a second external device connected to the second interface,
receive a first insertion/removal frequency indicating a frequency at which the first external device is disconnected from the first interface with the first power source information,
receive a second insertion/removal frequency indicating a frequency at which the second external device is disconnected from the second interface with the second power source information,
select one of the first external device and the second external device to which a power request is to be transmitted based on the first power source information and the second power source information, the first external device being selected as the external device to which the power request is to be transmit- ted when the first insertion/removal frequency is lower than the second insertion/removal frequency; and transmit the power request to the selected external device based on a result of the selection of one of the first external device and the second external device.

2. The information processing apparatus according to claim 1, wherein the controller is configured to determine whether both the first external device and the second external device are connected to an external power source based on the first power source information and the second power source information, determine whether neither the first external device nor the second external device are connected to the external power source based on the first power source information and the second power source information, and select one of the first external device and the second external device which is connected to the external power source as a destination of the power request in a case where the controller does not determine that both the first external device and the second external device are connected to an external power source.

3. The information processing apparatus according to claim 2, wherein the external device connected to the external power source is directly connected to the external power source and receives power from the external power source.

4. The information processing apparatus according to claim 2, wherein the external device connected to the external power source receives power from another external device directly connected to the external power source through a route that does not pass through the information processing apparatus.

5. The information processing apparatus according to claim 2, wherein the external power source is an AC power source.

6. The information processing apparatus according to claim 1, wherein in a case where the controller determines that the power request to the first external device is rejected, the controller is configured to transmit the power request to the second external device.

7. The information processing apparatus according to claim 1, wherein the controller is configured to receive a third insertion/removal frequency indicating a frequency at which an external power source is disconnected from the first external device with the first power source information, receive a fourth insertion/removal frequency indicating a frequency at which the external power source is disconnected from the second external device with the second power source information, and select the first external device as the external device to which the power request is to be transmitted in the selection of one of the first external device and the second external device when the third insertion/removal frequency is lower than the fourth insertion/removal frequency.

8. The information processing apparatus according to claim 1, wherein the controller is configured to perform third determination processing for determining whether both the first external device and the second external device have a battery based on the first power source information and the second power source information, and select the external device having the battery as the external device to which the power request is to be transmitted in the selection of one of the first external device and the second external device in a case where the controller does not determine that both the first external device and the second external device have a battery in the third determination processing.

9. The information processing apparatus according to claim 8, wherein the controller is configured to execute fourth determination processing for determining whether a remaining capacity of the battery of the first external device is greater than a remaining capacity of the battery of the second external device in a case where both the first external device and the second external device have a battery in the third determination processing, and select the first external device as the external device to which the power request is to be transmitted in the selection of one of the first external device and the second external device in a case where the controller determines that the remaining capacity of the battery of the first external device is greater than the remaining capacity of the battery of the second external device in the fourth determination processing.

10. The information processing apparatus according to claim 1, wherein the first interface is a first universal serial bus (USB) interface, and the second interface is a second universal serial bus (USB) interface.

11. A control method of an information processing apparatus including a first interface and a second interface, comprising:

receiving first power source information related to a power source of a first external device connected to the first interface;

receiving second power source information related to a power source of a second external device connected to the second interface;

receiving a first insertion/removal frequency indicating a frequency at which the first external device is disconnected from the first interface with the first power source information, receiving a second insertion/removal frequency indicating a frequency at which the second external device is disconnected from the second interface with the second power source information, selecting one of the first external device and the second external device to which a power request is to be transmitted based on the first power source information and the second power source information, the first external device being selected as the external device to which the power request is to be transmitted when the first insertion/removal frequency is lower than the second insertion/removal frequency; and transmitting the power request to the selected external device based on a result of the selection process.

12. The control method according to claim 11, further comprising:
  determine whether both the first external device and the second external device are connected to an external power source based on the first power source information and the second power source information;
  determine whether neither the first external device nor the second external device are connected to the external power source based on the first power source information and the second power source information; and
  select one of the first external device and the second external device which is connected to the external power source as a destination of the power request in a case where the controller does not determine that both the first external device and the second external device are connected to an external power source.

13. The information processing apparatus according to claim 12, wherein
  the external device connected to the external power source is directly connected to the external power source and receives power from the external power source.

14. The information processing apparatus according to claim 12, wherein
  the external device connected to the external power source receives power from another external device directly connected to the external power source through a route that does not pass through the information processing apparatus.

15. A non-transitory computer readable storage medium storing a program causing a computer to execute a process for controlling an information processing apparatus including a first interface and a second interface, the process comprising:
  receiving first power source information related to a power source of a first external device connected to the first interface,
  receiving second power source information related to a power source of a second external device connected to the second interface,
  receiving a first insertion/removal frequency indicating a frequency at which the first external device is disconnected from the first interface with the first power source information,
  receiving a second insertion/removal frequency indicating a frequency at which the second external device is disconnected from the second interface with the second power source information,
  selecting one of the first external device and the second external device to which a power request is to be transmitted based on the first power source information and the second power source information, the first external device being selected as the external device to which the power request is to be transmitted when the first insertion/removal frequency is lower than the second insertion/removal frequency, and
  transmitting the power request to the selected external device based on a result of the selection of one of the first external device and the second external device.

16. The non-transitory computer readable storage medium according to claim 15, wherein
  the process further comprising:
    determine whether both the first external device and the second external device are connected to an external power source based on the first power source information and the second power source information;
    determine whether neither the first external device nor the second external device are connected to the external power source based on the first power source information and the second power source information;
    select one of the first external device and the second external device which is connected to the external power source as a destination of the power request in a case where the controller does not determine that both the first external device and the second external device are connected to an external power source.

17. The non-transitory computer readable medium according to claim 16, wherein
  the external device connected to the external power source is directly connected to the external power source and receives power from the external power source.

18. The non-transitory computer readable medium according to claim 16, wherein
  the external device connected to the external power source receives power from another external device directly connected to the external power source through a route that does not pass through the information processing apparatus.

* * * * *